(12) United States Patent
Frushour

(10) Patent No.: US 10,459,867 B2
(45) Date of Patent: *Oct. 29, 2019

(54) METHOD FOR DYNAMIC BUS COMMUNICATION FOR AN ELECTROSURGICAL GENERATOR

(71) Applicant: COVIDIEN LP, Mansfield, MA (US)

(72) Inventor: Scott E. M. Frushour, Boulder, CO (US)

(73) Assignee: COVIDIEN LP, Mansfield, MA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/700,700

(22) Filed: Sep. 11, 2017

(65) Prior Publication Data

US 2017/0371826 A1    Dec. 28, 2017

Related U.S. Application Data

(63) Continuation of application No. 14/725,199, filed on May 29, 2015, now Pat. No. 9,760,520.

(60) Provisional application No. 62/023,328, filed on Jul. 11, 2014.

(51) Int. Cl.
*G06F 1/00*     (2006.01)
*G06F 13/40*    (2006.01)
*G06F 1/04*     (2006.01)

(52) U.S. Cl.
CPC ............ *G06F 13/4054* (2013.01); *G06F 1/04* (2013.01)

(58) Field of Classification Search
None
See application file for complete search history.

(56) References Cited

U.S. PATENT DOCUMENTS

| | | |
|---|---|---|
| 226,191 A | 4/1880 | Pratt |
| 4,254,442 A | 3/1981 | Dijkmans et al. |
| 4,609,860 A | 9/1986 | Fasen |
| 4,800,331 A | 1/1989 | Vesce et al. |
| 4,839,575 A | 6/1989 | MacFarlane |
| 5,355,077 A | 10/1994 | Kates |
| 5,370,645 A | 12/1994 | Klicek et al. |
| 5,420,779 A | 5/1995 | Payne |
| 5,522,081 A | 5/1996 | Carls |
| 5,559,423 A | 9/1996 | Harman |
| 5,592,072 A | 1/1997 | Brown |
| 5,592,394 A | 1/1997 | Wiscombe |
| 5,651,056 A | 7/1997 | Eting et al. |
| 5,671,149 A | 9/1997 | Brown |
| 5,694,029 A | 12/1997 | Hayes et al. |
| 5,770,940 A | 6/1998 | Goder |

(Continued)

*Primary Examiner* — Nitin C Patel

(57) ABSTRACT

A dynamic bus communication apparatus for an electrosurgical system includes a data wire, a clock wire, a first variable resistor coupled to the data wire, a second variable resistor coupled to the clock wire, an analog to digital converter (ADC), and a controller. The data wire is configured to transmit a data signal between a battery and an instrument powered by the battery. The clock wire is configured to transmit a clock signal between a battery and an instrument. The ADC is configured to sample the data signal and the clock signal at a substantially higher frequency than a frequency of the clock signal. The controller is configured to control a resistance of the first variable resistor and a resistance of the second variable resistor based on the digitally sampled data signal and the digitally sampled clock signal.

17 Claims, 6 Drawing Sheets

(56) References Cited

U.S. PATENT DOCUMENTS

| | | |
|---|---|---|
| 5,847,951 A | 12/1998 | Brown et al. |
| 5,864,457 A | 1/1999 | Kates et al. |
| 5,959,441 A | 9/1999 | Brown |
| 5,990,669 A | 11/1999 | Brown |
| 5,998,968 A | 12/1999 | Pittman et al. |
| 6,058,034 A | 5/2000 | Cummings et al. |
| 6,198,250 B1 | 3/2001 | Gartstein et al. |
| 6,362,672 B1 * | 3/2002 | Geist ............ H03K 5/082 327/170 |
| 6,693,782 B1 | 2/2004 | Lash |
| 6,835,491 B2 | 12/2004 | Gartstein et al. |
| 6,861,877 B2 * | 3/2005 | Shiah ............ H03K 5/04 327/176 |
| 6,906,567 B2 * | 6/2005 | Culler ......... H03K 19/00384 327/170 |
| 7,220,260 B2 | 5/2007 | Fleming et al. |
| 7,518,338 B2 | 4/2009 | Wang et al. |
| 7,646,229 B2 * | 1/2010 | Mei ............ G11C 7/1051 326/26 |
| 8,269,539 B2 * | 9/2012 | Juang ........... H03K 19/00361 327/170 |
| 8,956,349 B2 | 2/2015 | Aldridge et al. |
| 9,168,054 B2 | 10/2015 | Turner et al. |
| 9,760,520 B2 | 9/2017 | Frushour |
| 2002/0058933 A1 * | 5/2002 | Christopherson ...... A61B 18/14 606/34 |
| 2004/0135548 A1 | 7/2004 | Takano et al. |
| 2005/0001593 A1 | 1/2005 | Kawasumi et al. |
| 2005/0285647 A1 * | 12/2005 | Wilson ............ H03K 5/01 327/172 |
| 2008/0281316 A1 | 11/2008 | Carlton et al. |
| 2010/0094282 A1 | 4/2010 | Kabaya et al. |

* cited by examiner

METHOD FOR DYNAMIC BUS COMMUNICATION FOR AN ELECTROSURGICAL GENERATOR

CROSS-REFERENCE TO RELATED APPLICATIONS

This application is a continuation of U.S. patent application Ser. No. 14/725,199 filed on May 29, 2015, now U.S. Pat. No. 9,760,520, which claims priority to and the benefit of U.S. Provisional Patent Application No. 62/023,328, filed on Jul. 11, 2014, the entire disclosures of all of which are incorporated herein by reference.

BACKGROUND

Technical Field

The present disclosure relates to a dynamic system management communication bus. More particularly, the present disclosure relates to a system, apparatus, and method for dynamically adjusting pull-up resistors of a system management bus.

Background of Related Art

A system management communication bus ("SMBus") enables communication between multiple components of an electronic device, e.g., batteries and various subcomponents. As electrosurgical systems and electrosurgical generators become more portable and rely on smart batteries and other accessories, an SMBus will also likely be utilized in design and operation thereof.

Conventional SMBus systems include a pull-up resistor that controls a signal rise time. This pull-up resistor is optimized for one specific condition, such as a fixed number of devices connected to a central device (e.g., console). When a different number of devices from the predetermined number for which the pull-up resistor is optimized or different types of devices are connected to or removed from the console, the pull-up resistor does not operate optimally. This is due to a change in signal rise time. In particular, when the signal rise time becomes shorter, the signal characteristic may be deformed, and when the signal rise time becomes longer, the communication may fail altogether. Accordingly there is a need for an SMBus system configured to operate with a wide variety and number of devices.

SUMMARY

The present disclosure features a system, apparatus, and method for automatically and dynamically adjusting pull-up resistors of a system management bus so that a number of devices can be dynamically added to or removed from the system management bus.

In an embodiment, a dynamic bus communication apparatus for an electrosurgical system includes a data wire, a clock wire, a first variable resistor coupled to the data wire, a second variable resistor coupled to the clock wire, an analog to digital converter (ADC), and a controller. The data wire is configured to transmit a data signal between a battery and an instrument powered by the battery. The clock wire is configured to transmit a clock signal between a battery and an instrument. The ADC is configured to sample the data signal and the clock signal at a substantially higher frequency than a frequency of the clock signal. The controller is configured to control a resistance of the first variable resistor and a resistance of the second variable resistor based on the digitally sampled data signal and the digitally sampled clock signal.

In another embodiment, the controller is configured to adjust a signal rise time of the data signal by controlling the resistance of the first variable resistor. The controller is further configured to increase the resistance of the first variable resistor to increase the signal rise time of the data signal. The controller is further configured to decrease the resistance of the first variable resistor to decrease the signal rise time of the data signal.

In another embodiment, the controller is configured to adjust a signal rise time of the clock signal by controlling the resistance of the second variable resistor. The controller is further configured to increase the resistance of the second variable resistor to increase the signal rise time of the clock signal. The controller is further configured to decrease the resistance of the second variable resistor to decrease the signal rise time of the clock signal.

In another embodiment, each of the first and second variable resistors is selected from the group consisting of a potentiometer, a digital potentiometer, a membrane potentiometer, and a rheostat.

In another embodiment, the first and second variable resistors are a discrete digital potentiometer with a high level of resolution.

In another embodiment, the data wire and the clock wire are configured to couple to a plurality of electrosurgical instruments of the electrosurgical system.

In another embodiment, the signal rise time of the data wire and the signal rise time of the clock wire are based on a capacitance of a plurality of electrosurgical instruments which are connected to the signal clock wire and the data wire.

In another embodiment, a electrosurgical system includes a plurality of instruments configured to perform electrosurgery, a battery configured to provide power to the plurality of instruments, and a dynamic bus communication apparatus for communication between the plurality of instruments and the battery. The dynamical bus communication apparatus includes a data wire, a clock wire, a first variable resistor coupled to the data wire, a second variable resistor coupled to the clock wire, an analog to digital converter (ADC), and a controller. The data wire is configured to transmit a data signal between a battery and an instrument powered by the battery. The clock wire is configured to transmit a clock signal between a battery and an instrument. The ADC is configured to sample the data signal and the clock signal at a substantially higher frequency than a frequency of the clock signal. The controller is configured to control a resistance of the first variable resistor and a resistance of the second variable resistor based on the digitally sampled data signal and the digitally sampled clock signal.

In another embodiment, the controller is configured to adjust a signal rise time of the data signal by controlling the resistance of the first variable resistor. The controller is further configured to increase the resistance of the first variable resistor to increase the signal rise time of the data signal. In an aspect, the controller is configured to decrease the resistance of the first variable resistor to decrease the signal rise time of the data signal.

In another embodiment, the controller is configured to adjust a signal rise time of the clock signal by controlling the resistance of the second variable resistor. The controller is further configured to increase the resistance of the second variable resistor to increase the signal rise time of the clock signal. In an aspect, the controller is configured to decrease the resistance of the second variable resistor to decrease the signal rise time of the clock signal.

In yet another embodiment, a method for a dynamic bus communication apparatus for an electrosurgical generator includes digitally sampling a signal of the dynamic bus communication apparatus to obtain digital samples, re-creating the signal using the digital samples, measuring a signal rise time based on the re-created signal, comparing the measured signal rise time with a predetermined time, generating a control signal when the measured signal rise time is substantially different from the predetermined time according to the comparison, and adjusting a resistance value of a variable resistor of the dynamic bus communication apparatus to make a signal rise time substantially equal to the predetermined time when the measured signal rise time is substantially different from the predetermined time according to the comparison.

BRIEF DESCRIPTION OF THE DRAWINGS

Various embodiments are described in the present disclosure with reference to the drawings wherein.

DETAILED DESCRIPTION

Particular embodiments of the present disclosure are described with reference to the accompanying drawings. In the following description, well-known functions or constructions are not described in detail to avoid obscuring the present disclosure in unnecessary detail.

An electrosurgical generator generates electrosurgical energy suitable to achieve a desired electrosurgical effect. During an electrosurgical procedure, power may be generated from a battery. Thus, it may be desirable to communicate with the battery so that information related to the battery is provided to the electrosurgical generator as well as other electrosurgical devices during the course of the electrosurgery. An SMBus can perform such communication between the battery and other electrosurgical devices of the electrosurgical generator. The SMBus includes a variable resistor so that the resistance value may be adjusted to optimize communication performance among a power source, such as the battery, and the electrosurgical devices and/or the electrosurgical generator. In this way, the SMBus can communicate with the battery regardless of the number of electrosurgical devices, which are connected to the electrosurgical generator or the battery.

The systems and methods according to the present disclosure provide for improving functionalities of the SMBus so that any number of electrical instruments may be connected to an electrosurgical generator without degrading communication between the battery and the electrosurgical devices. For purposes of illustration, and in no way limiting the scope of the appended claims, the systems and methods for improving functionalities of the SMBus are described in the present disclosure in the context of electrosurgical systems and may be utilized in a variety of other electrical systems.

Figure 1:
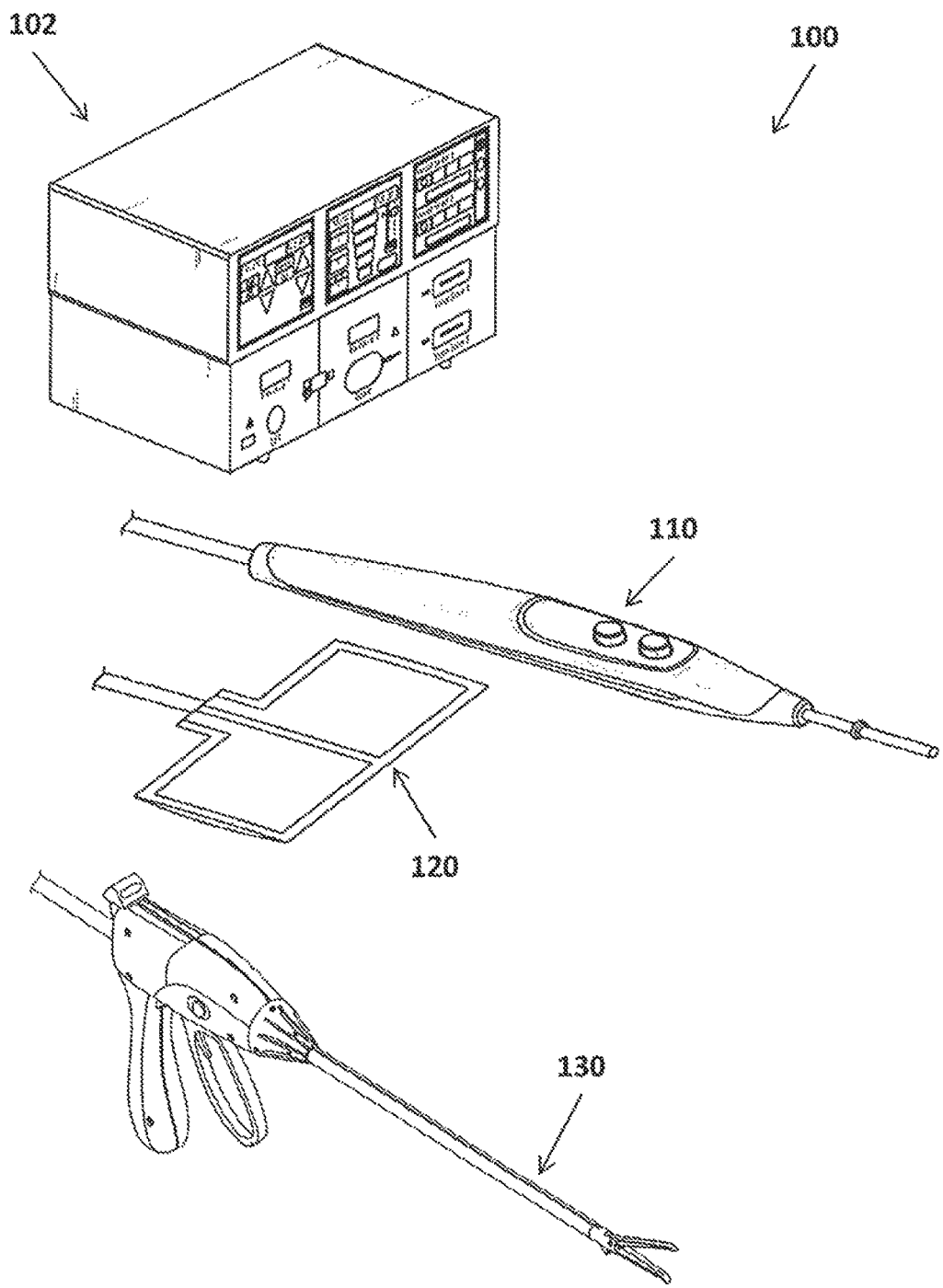
FIG. 1 is an illustration of an electrosurgical system in accordance with embodiments of the present disclosure.

FIG. 1 illustrates an electrosurgical system 100 in accordance with embodiments of the present disclosure. The electrosurgical system 100 includes an electrosurgical generator 102, which generates electrosurgical energy (e.g., radio frequency (RF) energy) to treat tissue. The electrosurgical generator 102 may be any suitable type of generator and may include a plurality of connectors to accommodate various types of electrosurgical instruments (e.g., a monopolar electrosurgical instrument 110 and a bipolar electrosurgical instrument 130). The electrosurgical generator 102 may also be configured to operate in a variety of modes, such as ablation, cutting, coagulation, sealing, and the like. The electrosurgical generator 102 generates electrosurgical energy based on the selected mode of operation (e.g., ablation, cutting, coagulation, sealing, etc.) and/or the sensed parameters of the tissue and/or the electrosurgical energy. The electrosurgical generator 102 may also include a plurality of output connectors corresponding to a variety of energy delivery devices, e.g., electrosurgical instruments. The electrosurgical generator 102 may also include an input port for a battery charger for charging the battery of the electrosurgical generator 102.

The electrosurgical system 100 further includes one or more energy delivery devices. In embodiments, the electrosurgical system 100 may include a monopolar electrosurgical instrument 110 having an electrode for treating tissue of the patient (e.g., an electrosurgical cutting probe) and a return pad 120. The monopolar electrosurgical instrument 110 may be connected to the electrosurgical generator 102 via one of the plurality of output connectors. The electrosurgical energy is supplied to the monopolar electrosurgical instrument 110, which applies the electrosurgical energy to treat the tissue. The electrosurgical energy is then returned to the electrosurgical generator 102 through the return pad 120. The return pad 120 provides sufficient contact area with the tissue so as to minimize the risk of tissue damage due to the electrosurgical energy applied to the tissue.

The electrosurgical system 100 may also include a bipolar electrosurgical instrument 130. The bipolar electrosurgical instrument 130 may be connected to the electrosurgical generator 102 via one of the plurality of output connectors. The electrosurgical energy is supplied to one of the two jaw members of the bipolar electrosurgical instrument 130 to treat the tissue, and is returned to the electrosurgical generator 102 through the other of the two jaw members.

The electrosurgical generator 102 may include a switching mechanism (e.g., relays) to switch the supply of the RF energy among the connectors to which various electrosurgical instruments may be connected. For example, when an electrosurgical instrument 110 is connected to the electrosurgical generator 102, the switching mechanism switches the supply of RF energy to the monopolar plug. In embodiments, the electrosurgical generator 102 may be configured to provide RF energy to a plurality of instruments simultaneously.

The electrosurgical generator 102 may also include a user interface having suitable user controls (e.g., buttons, activators, switches, or touch screens) for providing control parameters to the electrosurgical generator 102. These controls allow the user to adjust parameters of the electrosurgical energy (e.g., the power level or the shape of the output waveform) so that the electrosurgical energy is suitable for a particular surgical procedure (e.g., ablation, cutting, coagulation, sealing, etc.). The energy delivery devices 110 and 130 may also include a plurality of user controls.

In addition, the electrosurgical generator 102 may include one or more display screens for displaying a variety of information related to operation of the electrosurgical generator 102 (e.g., intensity settings and treatment complete indicators).

Figure 2:
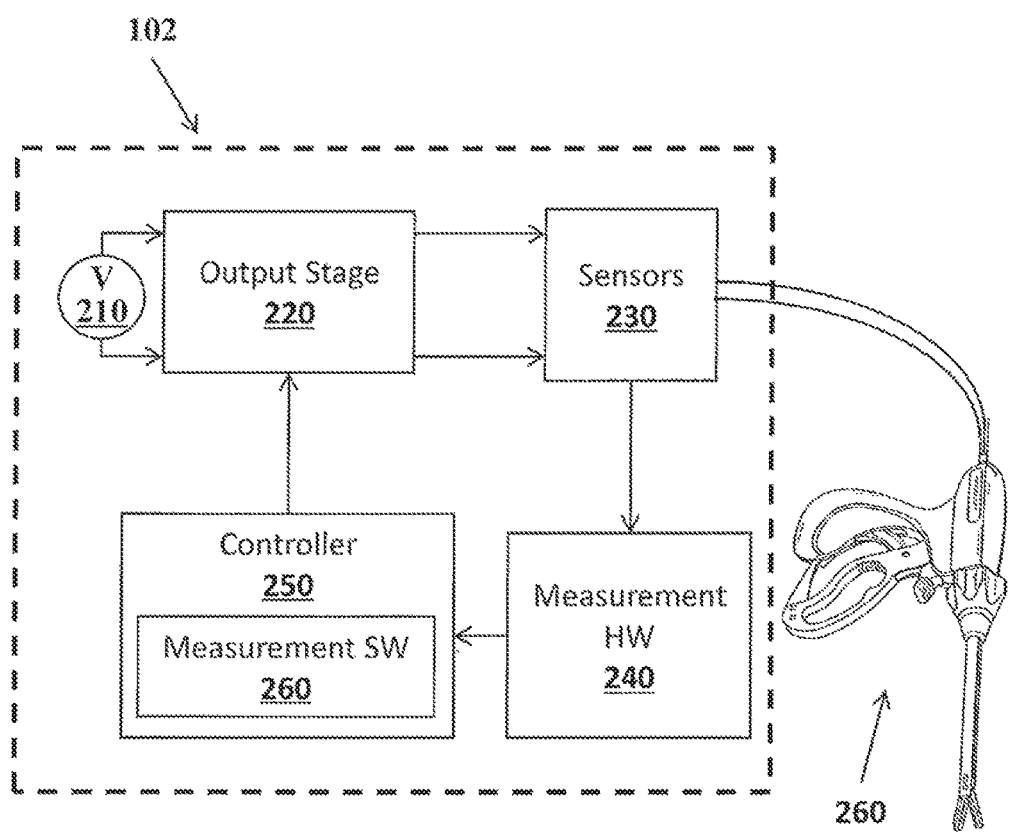
FIG. 2 is a block diagram of the electrosurgical generator of FIG. 1 in accordance with embodiments of the present disclosure.

FIG. 2 is a block diagram of an electrosurgical generator 102 of the electrosurgical system 100 of FIG. 1. The electrosurgical generator 102 includes a voltage source 210, an output stage 220, one or more sensors 230, measurement hardware 240, and a controller 250. The voltage source 210 may be a battery, a smart battery, or a rechargeable battery. The voltage source 210 may provide a direct current ("DC") to the output stage 220 which converts DC to an alternating current ("AC") having a frequency suitable for an electrosurgical procedure (e.g., microwave or radio frequency).

In embodiments, instead of having a voltage source 210, the electrosurgical generator 102 may be configured to connect to an AC power source, such as a wall power outlet or other power outlet, which generates AC having a relatively low frequency (e.g., 25 Hz, 50 Hz, 60 Hz, etc.). The AC power source provides AC power to the output stage 220 which converts the low frequency AC to an AC having a frequency suitable for an electrosurgical procedure. During the conversion from low frequency AC to high frequency AC, the output stage 220 may convert the low frequency AC to DC and then invert the DC to the high frequency AC.

The appropriate frequency for the electrosurgical energy may differ based on electrosurgical operations and modes of electrosurgery. Nerve and muscle stimulations cease at about 100,000 cycles per second (100 kHz). Thus, above this point some electrosurgical procedures may be performed safely, i.e., the electrosurgical energy passes through a patient to targeted tissue with minimal neuromuscular stimulation. Electrosurgical procedures may be performed from about 20 kHz to about 500 kHz.

The output stage 220 may output AC signals with various frequencies suitable for electrosurgical procedures. The output stage 220 is electrically coupled to an energy delivery device 260 (e.g., the bipolar electrosurgical instrument 130 or the monopolar electrosurgical instrument 110 of FIG. 1), which treats tissue with the electrosurgical energy.

The plurality of sensors 230 sense voltage and current waveforms at the output of the output stage 220 before being supplied to the energy delivery device 260. The plurality of sensors 230 may include main and redundant sensors for sensing voltage and current waveforms. This redundancy feature ensures the reliability, accuracy, and stability of the voltage and current measurements at the output of the output stage 220.

In embodiments, the plurality of sensors 230 may include fewer or more sets of voltage and current sensors depending on the application or the design requirements. The plurality of sensors 230 may include any known technology for sensing voltage and current including, for example, a Rogowski coil for sensing current.

The sensed voltage and current waveforms are provided to the measurement hardware 240 that converts analog voltage and current waveforms into digital voltage and current waveforms by using analog-to-digital converters ("ADCs"), which is not shown. The ADCs sample the sensed voltage and current waveforms to obtain digital samples of the voltage and current waveforms generated by the output stage 220. The ADCs may be configured to sample outputs of the sensors 230 at a sampling frequency that is an integer multiple of the frequency of the generated electrosurgical energy.

The ADCs may sample only a fixed range of magnitudes of an analog signal. Thus, when the magnitudes of the sensed voltage and current waveforms are higher than the fixed range of magnitudes, the measurement hardware 240 may reduce the magnitudes of the sensed voltage and current waveforms to the fixed range of magnitudes prior to sampling the sensed voltage and current waveforms. The measurement hardware 240 may then increase the magnitudes of the digital samples to compensate for the reduction of the magnitudes after sampling of the sensed voltage and current waveforms by the ADC.

The controller 250 receives the digital samples of the sensed voltage and current waveforms from the measurement hardware 240 to generate a control signal, which is provided to the output stage 220 to control the output of the output stage 220. In particular, the digital samples from the measurement hardware 240 are processed by the measurement software 260 to obtain control parameters and the controller 250 uses the control parameters of the measurement software 260 to generate a control signal to control the output stage 220.

The measurement software 260 may further process the digital samples to calculate RMS voltage, average power, and current values of the generated electrosurgical energy and/or impedance of the tissue being treated. The measurement software 260 provides the control parameters to the controller 250. The controller 250 may then control the output stage 220 based on the average power and/or the impedance of the tissue by comparing them with a power-impedance profile specific to an electrosurgical procedure, e.g., ablation.

In embodiments, the controller 250 and the measurement software 260 may be implemented in a digital signal processor (DSP), application-specific integrated circuit (ASIC), field-programmable gate array (FPGA), different types of programmable read-only memory (e.g., PROM, EPROM, EEPROM, etc.), or any other suitable logic circuit.

The generated energy by the output stage 220 may be provided to the energy delivery device 260 to treat tissue. Since the electrosurgical generator 102 includes several output ports, multiple energy delivery devices may be connected to the electrosurgical generator 102 at the same time. Further, a battery charger may also be connected to the electrosurgical generator 102 to charge power to the voltage source (e.g., battery 210). The battery 210 may communicate information about the battery 210 with the multiple energy delivery devices and the battery charger via an SMBus. Further descriptions of the SMBus are made in FIG. 3.

Figure 3:
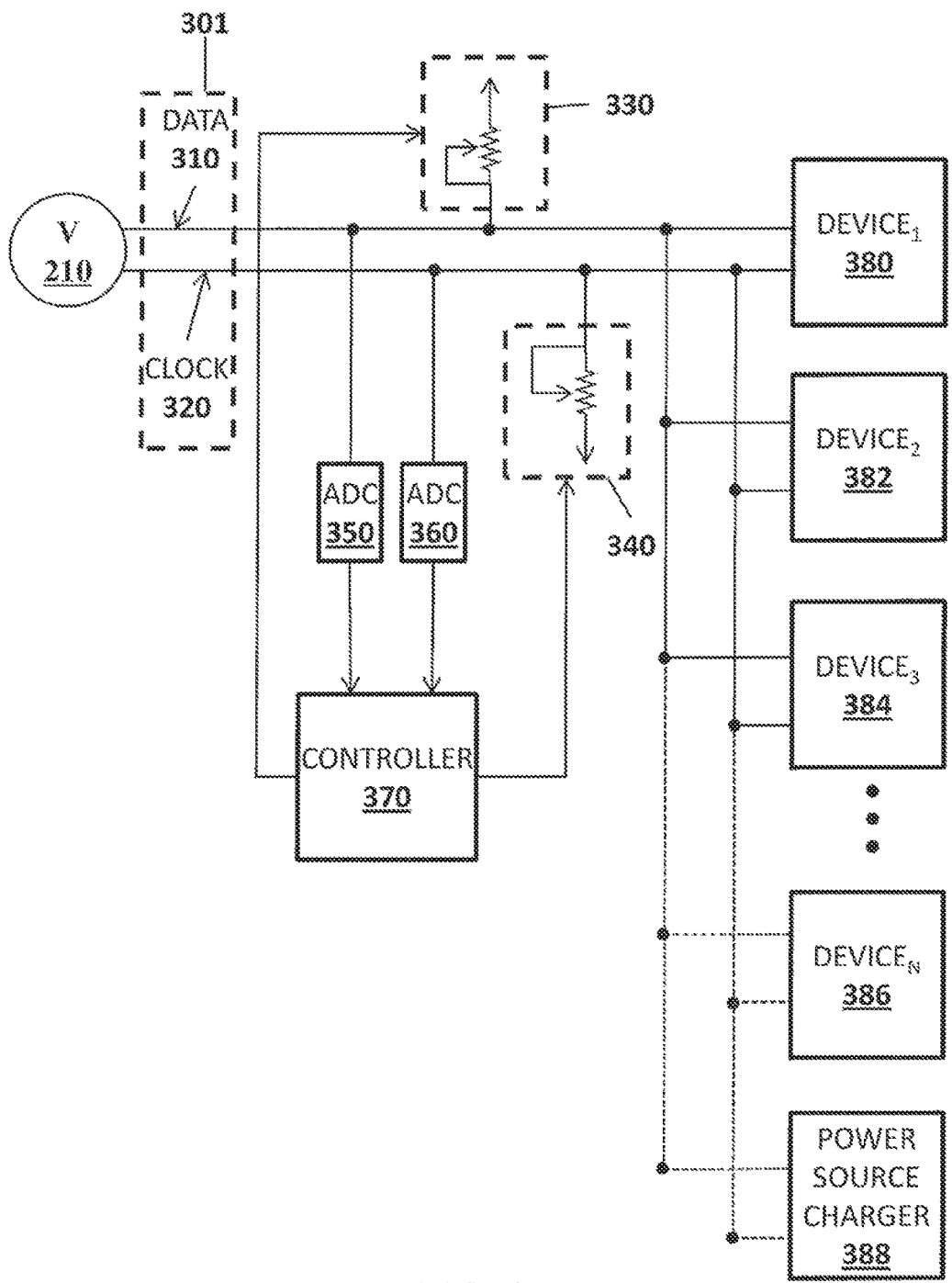
FIG. 3 is a block diagram of an electrosurgical system including an SMBus providing communication between a battery and a plurality of electrosurgical devices of the electrosurgical system in accordance with embodiments of the present disclosure.

FIG. 3 is a schematic block diagram illustrating communications among a battery 210 of the electrosurgical generator 102 of FIG. 2 and electrosurgical devices via an SMBus 301. The battery 210 is connected to electrosurgical devices (e.g., the monopolar electrosurgical instrument 110 or the bipolar electrosurgical instrument 130), devices 380, device2 382, and device3 384 via the SMBus 301. The battery 210 may be a smart battery and have ports for data transmission. The battery 210 may internally measure voltage and current levels and deduce remaining charge level and state of health ("SoH") parameters, indicating the state of the cells of the battery 210. The battery 210 may also control its charging process based on the SoH and the remaining charge level.

The SMBus 301 includes a single-ended two wire bus for the purpose of communication. One wire, data wire 310, is for transmitting a data signal 510 (FIG. 5) and the other wire, clock wire 320, is for transmitting a clock signal 550 (FIG. 5). The SMBus 301 may further connect the battery 210 to additional electrosurgical devices, such as device$_N$ 386, and to power source charger 388. The SMBus 301 may transmit information of the battery 210 (e.g., the internally measured voltage and current, remaining a charge level, the SoH, etc.) devices 380-388 which is connected to the battery 210. The SMBus 301 may also transmit the identification number of the battery 210. The combination of the data wire 310 and the clock wire 320 transmits such information and will be further described in FIG. 4.

The data wire 310 is connected to a resistive element 330 and the clock wire 320 is also connected to another resistive element 340. There are three different statuses (i.e., high, low, and float) in the communication via the SMBus 301. The high status is the logical high value, i.e., 1 or true, and the low status is the logical low value, i.e., 0 or false. The float status occurs when no signal is provided by the battery 210, meaning that any of the high and low statuses can be transmitted. Thus, unwanted or undesired value may be transmitted during the float status so that the electrosurgical system may be harmed or at least malfunction. In this situation, the resistive elements 330 and 340 act as pull-up resistors, meaning the resistive elements 330 and 340 pull an input voltage value up to the input voltage to the resistive elements 330 and 340, e.g., the logical high value, when no signal is transmitted. In this way, definite data, either high or low, is transmitted via the SMBus 301 under the float status.

The resistance value of the resistive element 330 or 340 controls the rise time of the data signal 510 and the clock signal 550. In embodiments, when a fixed number of devices are connected to the battery 210, the total capacitance value of the connected devices is maintained as a constant. Thus, by changing the resistance value of the resistive element 330 or 340, the signal rise time of the data signal 510 and the clock signal 550 may be controlled based on the resistance value of the pull-up resistors.

The resistive element 330 or 340 is a variable resistor and varies based on a total capacitance of the devices connected to the battery 210 and the predetermined signal rise time. The resistive elements 330 and 340 may be potentiometers, digital potentiometers, membrane potentiometers, rheostats, or the like.

The data wire 310 is further connected to an analog to digital converter ("ADC") 350 and the clock wire 320 is also connected to another ADC 360. The ADCs 350 and 360 samples the data signal 510 and the clock signal 550 at a frequency significantly higher than the frequency of the data signal 510 or clock signal 550, and outputs digital samples. The ADCs 350 and 360 provide the digital samples to a controller 370, which measures a signal rise time for the data signal 510 or the clock signal 550.

When the number of devices, which are connected to the battery 210, varies, the total capacitance value of the connected devices varies accordingly. Thus, the signal rise time is correspondingly affected. The signal rise time is also closely related to the time constant, which is a product of the resistance value of the variable resistor 330 or 340 and the capacitance value of the devices which are connected to the battery 210.

The controller 370 may be the controller 250 of the electrosurgical generator 102 of FIG. 2 or may be a separate dedicated controller (not shown in FIG. 2) of the electrosurgical generator 102. The controller 370 receives the digital samples of the signal and re-creates the signal in a digital format. The controller 370 then measures the signal rise time of the signal by measuring the signal rise time of the re-created digital signal. The controller 370 compares the measured signal rise time with a predetermined signal rise time, which may be the desired or required time for communicating between the battery 210 and the connected devices 380-388. When the measured signal rise time is substantially equal to the predetermined signal rise time, the resistance value of the resistive element 330 and 340 remains unchanged. However, when the measured signal rise time is substantially different from the predetermined signal rise time, the controller 370 generates and outputs a control signal to the resistive elements 330 and 340 to adjust the resistance value of the resistive elements 330 and 340.

In embodiments, the predetermined rise time of the data signal 510 may be different from the predetermined signal rise time of the clock signal 550. Thus, the controller 370 may control the resistive elements 330 and 340 separately. That is, the controller 370 may generate and output a data control signal to the resistive element 330 to adjust the resistance value of the resistive element 330, and generate and output a clock control signal to the resistive element 340 to adjust the resistance value of the resistive element 340.

In embodiments, the resistive element 330 or 340 may be controlled to adjust its resistance value in response to a measured difference of the signal rise time. In other words, when the signal rise time increases or decreases by a specified period of time, the resistance value of the resistive element 330 or 340 may be adjusted to decrease or increase its resistance value so that the signal rise time stays in a predetermined range relative to the predetermined signal rise time.

In embodiments, when the predetermined signal rise time is 1 μs and the total capacitance value of the connected devices is 10 pico farad (pf), then the resistance value of the resistive element is adjusted to 100 kilo ohms (kΩ) with assumption that the time constant is equal to the signal rise time. The time constant is a product of the resistance value and a capacitance value. When the capacitance value of the connected devices increases from 10 pf to about 20 pf by adding a new device, then the resistance value of the resistive element 330 or 340 may correspondingly change from 100 kΩ to 50 kΩ so that the time constant with the capacitance value of about 20 pf is substantially equal to the signal rise time with the capacitance value of 10 pf. In embodiments, when the resistive element is a potentiometer, a control signal is issued to the potentiometer so that the potentiometer turns shifts to adjust its resistance value.

In other embodiments, when a connected device is removed, the total capacitance decreases and the signal rise time decreases correspondingly. Thus, in order to maintain the signal rise time substantially constant, the resistance value of the resistive element 330 or 340 increases to compensate for the decrease of the total capacitance value. However, as connected devices are removed, the signal rise time may not return to the intended signal rise time. In this case, the resistance value of the resistive element is increased sufficiently so that only the signal fall time meets the requirement of the communication (e.g., SMBus specification).

In further embodiments, the signal rise time for either data signal 510 or the clock signal 550 may be determined during a period in which a signal rises from about 10 percent of the maximum signal amplitude to about 90 percent of the maximum signal amplitude. In this case, the signal rise time may be a product of a scalar 2.22 and a time constant.

Figure 4:
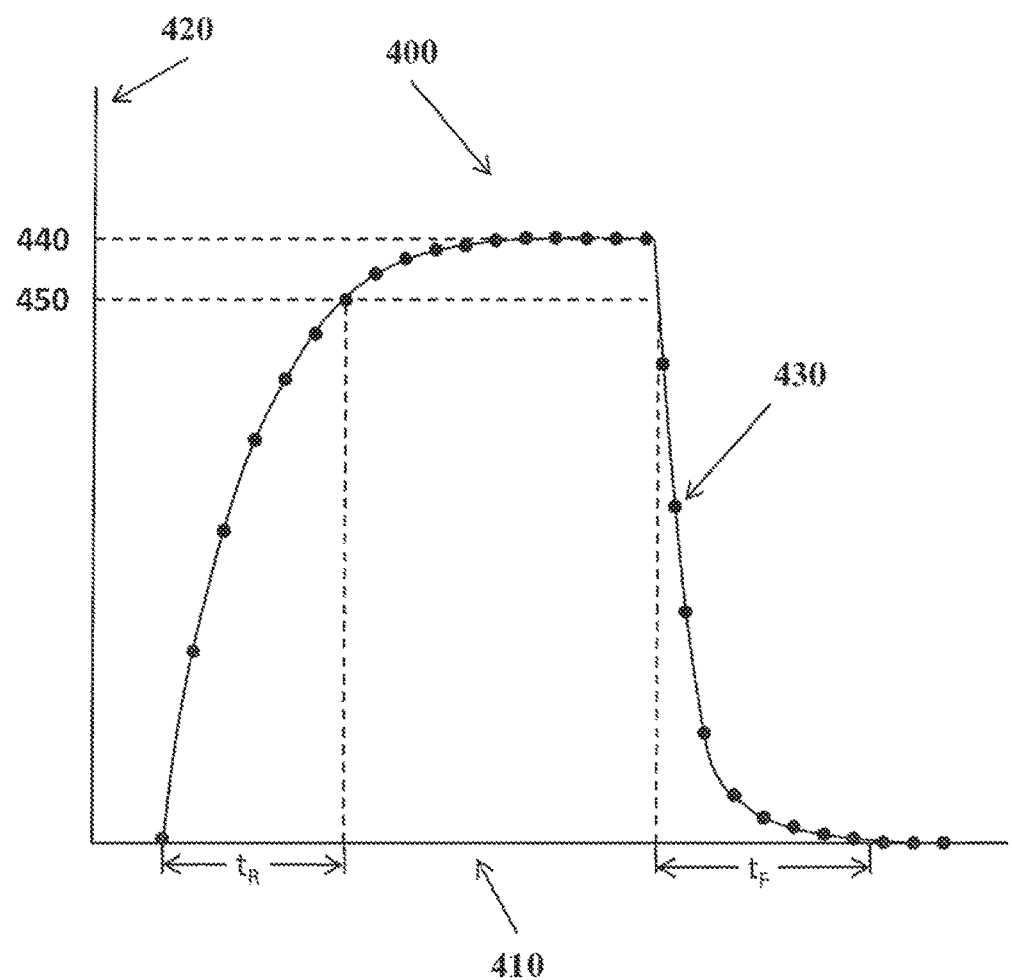
FIG. 4 is a plot of a signal rise time of the SMBus of the electrosurgical system of FIG. 3 in accordance with embodiments of the present disclosure.
Figure 5:
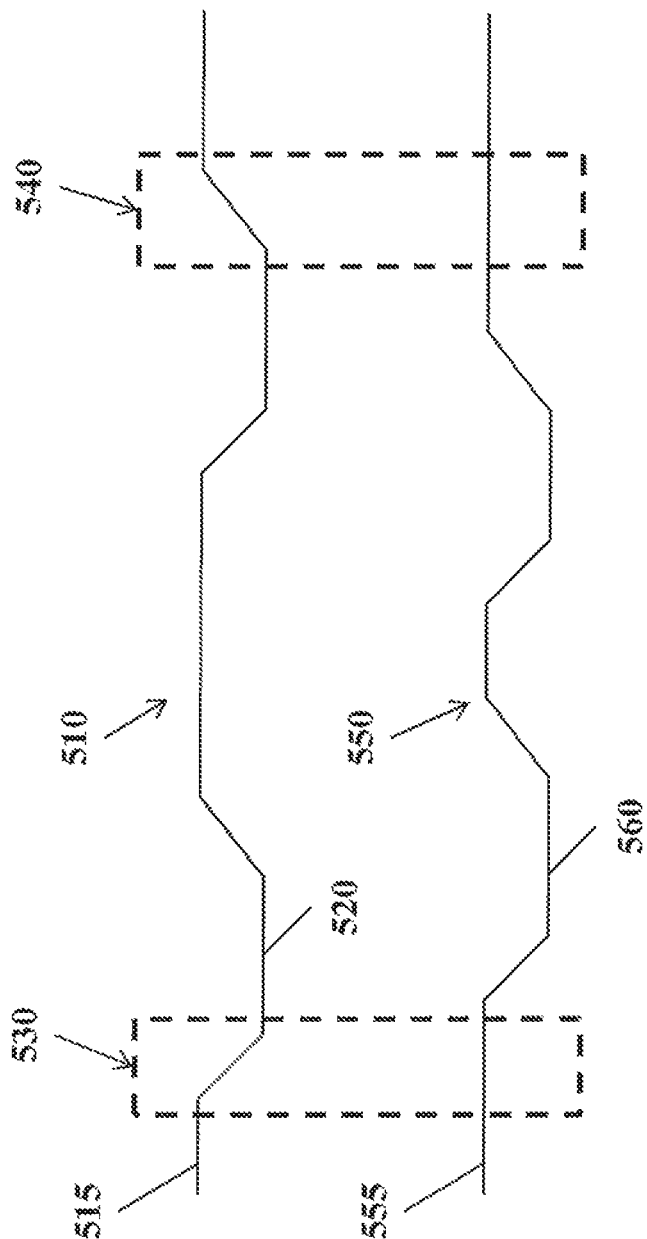
FIG. 5 is a graphical representation of data signal and clock signal of the SMBus of the electrosurgical system of FIG. 3 in accordance with embodiments of the present disclosure.

FIG. 4 is a plot 400 of a signal (i.e., the data signal 510 or the clock signal 550) of the SMBus 301 in the electrosurgical system of FIG. 3. The signal is digitally sampled by an ADC and digital samples are shown as black circular dots 430 on the plot 400. The horizontal axis 410 represents time and the vertical axis 420 may represent amplitude of voltage or current of the signal. The black circular dots 430 on the plot 400 may show that the ADC digitally samples the signal at a substantially higher frequency than the frequency of the signal.

The plot 400 shows that the signal rises from the ground to the maximum amplitude 440 and falls from the maximum amplitude 440 to the ground. The signal rise time, $t_R$, of the signal may be determined from the ground to a certain level of the signal, such as an amplitude 450 which may be 80 or 90 percent of the maximum amplitude 440. In embodiments, $t_R$ may be determined as a period during which the signal rises from about 10 percent to about 90 percent of the maximum amplitude 440 or from 15 percent to 85 percent of the maximum amplitude 440. In FIG. 4, the signal rise time, $t_R$, is measured as a time during which the signal rises from the ground to about 90 percent of the maximum amplitude 440.

The time constant of a resistor-capacitor (RC) circuit is measured by a product of the resistance value of the resistor and the capacitance value of the capacitor. This time constant represents a time during which a voltage rises from the minimum voltage to about 63 percent of the maximum voltage. Thus, the time constant is closely related to the signal rise time. When a relationship between the signal rise time and the time constant is determined, a scalar factor which is multiplied to the time constant to match the signal rise time is also determined. In this way, when a capacitance value of the connected devices varies or the number of connected devices to the battery 210 in the electrosurgical generator 102 varies, a new signal rise time is measured and a resistance value of the resistive element 330 or 340 may be adjusted to match the new signal rise time to the predetermined signal rise time.

The signal fall time, $t_F$, may also be measured from the amplitude 450 to the ground. In other embodiments, the signal fall time, $t_F$, may be measured differently from the measurement of the signal rise time, $t_R$.

FIG. 5 shows data signal 510 and clock signal 550 of the SMBus 301 in the electrosurgical generator of FIG. 3. The data signal 510 rises up to a maximum amplitude 515 and falls down to a minimum amplitude 520. The clock signal 550 rises up to a maximum amplitude 555 and falls down to a minimum amplitude 560. A dashed box 530 indicates a start condition for transmitting information using combination of the data signal 510 and the clock signal 550 and a dashed box 540 indicates an end condition for transmitting information.

The start condition 530 may be met when the data signal 510 falls from the maximum amplitude 515 down to the minimum amplitude 520, while the clock signal 550 is on high or stays in the maximum amplitude 555. The end condition 540 may be met when the data signal 510 rises from the ground 520 up to the maximum amplitude 515, while the clock signal 550 is on low or stays on the maximum amplitude 555. During a period between the start condition 530 and the end condition 540, the data signal 510 and the clock signal 550 may transmit information between the battery and the devices 380-388 which are connected with the battery 210 via the SMBus 301.

In embodiments, the mode of transmission of information via the SMBus 301 may follow system management bus specification, inter-integrated circuit ($I^2C$) bus specification, or integrated interchip sound ($I^2S$) bus specification.

Figure 6:
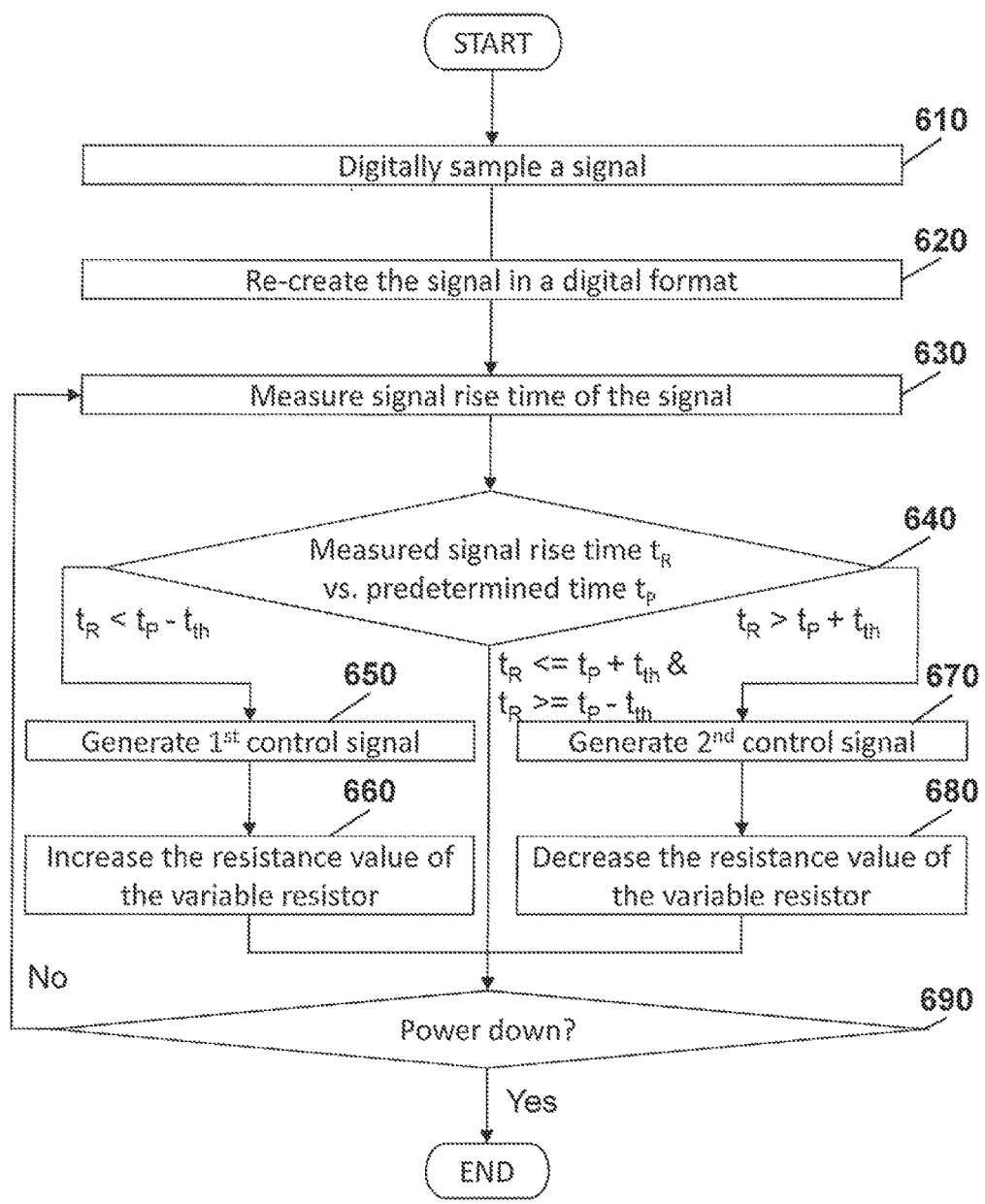
FIG. 6 is a flowchart illustrating a method for dynamically adjusting a variable resistor of the SMBus of the electrosurgical system of FIG. 3 in accordance with embodiments of the present disclosure.

FIG. 6 is a flowchart illustrating a method for dynamically adjusting a resistance value of a variable resistor 330 or 340 of the SMBus 301 of the electrosurgical generator 102 (FIGS. 1-3). The method starts when power is turned on. In step 610, the signal (i.e., the data signal 510 or the clock signal 550) of the SMBus 301 is digitally sampled. The digital sampling frequency is substantially higher than the frequency of the signal so that a sufficient number of the digital samples within the signal rise time of the signal are generated. In step 620, the signal is re-created with the digital samples. In step 630, the controller 370 of the electrosurgical generator 102 measures the signal rise time by measuring the signal rise time of the digitally re-created signal, which is shown as the circular dots 430 in FIG. 4.

In step 640, the measured signal rise time, $t_R$, is compared with a predetermined signal rise time $t_P$. The signal rise time may vary when an electrosurgical instrument (e.g. the monopolar electrosurgical instrument 110, the bipolar electrosurgical instrument 130, the power source charger 388, etc.) is additionally connected to or removed from the battery 210 of the electrosurgical generator 102. When the measured signal rise time, $t_R$, is too fast or too short, that may limit the pull-down ability of the electro surgical generator 102, and when the measured signal rise time, $t_R$, is too weak or too long, that may deform the signal characteristic, exceed the rise time specification of the electrosurgical generator 102, and cause the electrosurgical generator 102 to have communication failures.

In step 640, when it is determined that the measured signal rise time, $t_R$, is in a tolerance range, meaning that the measured signal rise time, $t_R$, is within a range from the predetermined signal rise time, $t_P$, minus a threshold time, $t_{th}$, to the predetermined signal rise time, $t_P$, plus the threshold time, $t_{th}$, the method does not change the resistance value of the variable resistor and proceeds to step 690.

In step 640, when it is determined that the measured signal rise time, $t_R$, is less than the value subtracted from the predetermined signal rise time, $t_P$, by the threshold time, $t_{th}$, the method proceeds to step 650. This situation may occur when one or more electrosurgical instruments (e.g. the monopolar electrosurgical instrument 110, the bipolar electrosurgical instrument 130, the power source charger 388, or the like) are removed from the battery 210 of the electrosurgical generator 102. In step 650, a first control signal is generated. The first control signal is then provided to the variable resistor 330 or 340 to increase the resistance value of the variable resistor 330 or 340 in step 660. In this way, the variable resistor 330 or 340 may adjust the signal rise time when one or more electrosurgical instruments are disconnected from the battery 210. Then the method proceeds to step 690.

In step 640, if it is determined that the measured signal rise time, $t_R$, is greater than the sum of the predetermined signal rise time, $t_P$, and the threshold time, $t_{th}$, the method proceeds to step 670. This situation may occur when one or more electrosurgical instruments are additionally connected to the battery 210 of the electrosurgical generator 102. In step 670, a second control signal is generated. The second control signal is provided to the variable resistor 330 or 340 to decrease the resistance value of the variable resistor 330 or 340 in step 680. In this way, the variable resistor 330 or 340 may adjust the signal rise time when one or more electrosurgical instruments are additionally connected to the battery 210 of the electrosurgical generator 102. Then the method proceeds to step 690.

In step 690, it is determined whether the power is turned down. When it is determined that the power is not turned down, the method continues iterating through the steps 620-690. When it is determined that the power is turned down, the method is ended.

While several embodiments have been shown in the drawings and/or described in the disclosure, it is not intended that the disclosure be limited to the several embodiments, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended to this disclosure.

What is claimed is:

1. A method for a dynamic bus communication for an electrosurgical generator, the method comprising:
   digitally sampling a first signal of a dynamic bus communication apparatus to obtain digital samples;
   generating a second signal using the digital samples;
   measuring a signal rise time of the second signal;
   comparing the signal rise time with a predetermined time; and
   adjusting the signal rise time to be equal to the predetermined time in response to the signal rise time being different from the predetermined time.

2. The method according to claim 1, wherein adjusting the signal rise time includes adjusting a resistance value of a variable resistor of the dynamic bus communication apparatus.

3. The method according to claim 2, wherein adjusting the resistance value includes controlling a first resistance of a first variable resistor and controlling a second resistance of a second variable resistor.

4. The method according to claim 3, wherein adjusting a resistance value includes increasing the first resistance of the first variable resistor to increase the signal rise time.

5. The method according to claim 3, wherein adjusting a resistance value includes decreasing the first resistance of the first variable resistor to decrease the signal rise time.

6. The method according to claim 3, where each of the first variable resistor and the second variable resistor is selected from the group consisting of a potentiometer, a digital potentiometer, a membrane potentiometer, and a rheostat.

7. The method according to claim 3, where each of the first and second variable resistors are discrete digital potentiometers.

8. The method according to claim 2, wherein the dynamic bus communication apparatus is configured to couple to a plurality of electrosurgical instruments coupled to the electrosurgical generator.

9. The method according to claim 8, where the signal rise time is based on a capacitance of a plurality of electrosurgical instruments which are coupled to the dynamic bus communication apparatus.

10. The method according to claim 1, further comprising coupling one or more electrosurgical instruments to the dynamic bus communication apparatus.

11. The method according to claim 1, wherein the first signal is a clock signal.

12. The method according to claim 1, wherein the first signal is a data signal.

13. The method according to claim 1, wherein the predetermined time is determined upon each time the electrosurgical generator is powered on.

14. The method according to claim 1, wherein the predetermined time is determined during production of the electrosurgical generator.

15. The method according to claim 2, further comprising:
   generating a control signal when the signal rise time is different from the predetermined time according to the comparison.

16. The method according to claim 15, wherein adjusting the resistance value includes transmitting the control signal to the variable resistor.

17. The method according to claim 1, wherein the second signal is a recreation of the first signal.

* * * * *